(12) United States Patent
Cao et al.

(10) Patent No.: US 11,161,609 B2
(45) Date of Patent: Nov. 2, 2021

(54) MULTI-UAV CONTINUOUS MOVEMENT CONTROL METHOD, APPARATUS, DEVICE, AND STORAGE MEDIUM FOR ENERGY EFFICIENT COMMUNICATION COVERAGE

(71) Applicant: BEIHANG UNIVERSITY, Beijing (CN)

(72) Inventors: Xianbin Cao, Beijing (CN); Wenbo Du, Beijing (CN); Peng Yang, Beijing (CN); Xing Xi, Beijing (CN); Dapeng Wu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 352 days.

(21) Appl. No.: 16/270,536

(22) Filed: Feb. 7, 2019

(65) Prior Publication Data
US 2020/0115047 A1 Apr. 16, 2020

(30) Foreign Application Priority Data
Oct. 11, 2018 (CN) .......................... 201811182897.9

(51) Int. Cl.
*B64C 39/02* (2006.01)
*H04B 7/10* (2017.01)
(Continued)

(52) U.S. Cl.
CPC ......... *B64C 39/024* (2013.01); *G08G 5/0021* (2013.01); *H04B 7/185* (2013.01); *B64C 2201/122* (2013.01); *B64C 2201/143* (2013.01)

(58) Field of Classification Search
CPC ............ B64C 39/024; B64C 2201/122; B64C 2201/143; G08G 5/0021; H04B 7/185
(Continued)

(56) References Cited

U.S. PATENT DOCUMENTS

2019/0004518 A1* 1/2019 Zhou ..................... G06N 3/04

FOREIGN PATENT DOCUMENTS

CN 105141545 A 12/2015
CN 106604334 A 4/2017
(Continued)

OTHER PUBLICATIONS

"Liu et al., Energy-Efficient UAV Control for Effective and Fair Communication Coverage: A Deep Reinforcement Learning Approach, Sep. 9, 2018, IEEE Journal on Selected Areas in Communications, vol. 36 No. 9, p. 2059-2068" (Year: 2018).*
(Continued)

*Primary Examiner* — Tyler J Lee
(74) *Attorney, Agent, or Firm* — J.C. Patents

(57) ABSTRACT

Provided is a multi-UAV continuous movement control method for energy efficient communication coverage. The method includes: determining observation information at a current moment, the observation information including one or more of the following: energy consumption information of a UAV, coverage indication information of users covered by a UAV network facilitated by the UAV or coverage fairness information of the UAV network; determining control information corresponding to the observation information using a DDPG model according to the observation information, wherein the DDPG model is generated from a DDPG algorithm with sample information as an input, the sample information indicating a mapping relationship between sampled observation information and sampled control information; and controlling the UAV to move according to the control information. The value of the mobile policy from the DDPG model is continuous, thus mitigating the imprecision in existing movement control due to the discreteness in evaluating the mobile policy.

13 Claims, 7 Drawing Sheets

(51) Int. Cl.
*G08G 5/00* (2006.01)
*H04B 7/185* (2006.01)

(58) Field of Classification Search
USPC .......................................................... 701/120
See application file for complete search history.

(56) References Cited

FOREIGN PATENT DOCUMENTS

| | | | |
|---|---|---|---|
| CN | 106774382 A | 5/2017 | |
| CN | 107888561 A | 4/2018 | |
| CN | 108304983 A | 7/2018 | |
| CN | 108401015 A | 8/2018 | |
| CN | 108427286 A | 8/2018 | |
| CN | 108536011 A | 9/2018 | |

OTHER PUBLICATIONS

Alzenad et al., 3-D Placement of an Unmanned Aerial Vehicle Base Station for Maximum Coverage of Users With Different QoS Requirements, Feb. 2018, IEEE Wireless Communications Letters, vol. 7 No. 1, p. 38-41 (Year: 2018).*
The first Office Action of CN application No. 2018111828979.
D1: "Caching in the sky Proactive Deployment of Cache Enabled Unmanned Aerial Vehicles for Optimized Quality of Experience", IEEE Journal on Seleted Areas in Communications, vol. 35, No. 5, May 2017.
D2: "Continuous control with deep reinforcement learning", ICLR 2016.

* cited by examiner

MULTI-UAV CONTINUOUS MOVEMENT CONTROL METHOD, APPARATUS, DEVICE, AND STORAGE MEDIUM FOR ENERGY EFFICIENT COMMUNICATION COVERAGE

CROSS-REFERENCE TO RELATED APPLICATION

This application claims priority to Chinese Patent Application No. 201811182897.9, filed on Oct. 11, 2018, which is hereby incorporated by reference in its entirety.

TECHNICAL FIELD

The disclosure relates to the control field, and particularly relates to a multi-UAV continuous movement control method, apparatus, device, and storage medium for energy efficient communication coverage.

BACKGROUND

Recently, unmanned aerial vehicles (UAVs) equipped with telecommunication service devices (e.g., base station) can be leveraged to provide communication service.

In prior art, deployment of UAVs needs to be adjusted, i.e., UAV movement needs to be controlled, so as to adapt the communication network provided by the telecommunication service facility onboard the UAV to the communication requirements of users. Q-learning is usually utilized to determine positions of UAVs in 3-dimensional space in real time. Specifically, the Q-learning can lead to a deterministic mapping relationship between a mobile policy and its reward under different conditions. Further, a mobile policy with the maximum reward may be determined according to the mapping relationship and the condition of the current situation, and the flight of UAVs may be controlled based on the mobile policy.

Therefore, in prior art, the Q-learning can only lead to a deterministic mobile policy, the value of which is discrete, causing a problem of imprecise movement control for the UAVs.

SUMMARY

Embodiments of this disclosure provide a multi-UAV continuous movement control method, apparatus, device, and storage medium for energy efficient communication coverage to make up for a shortcoming in prior art where movement control is inaccurate because mobile policy is evaluated discretely.

In a first aspect, an embodiment of this disclosure provides a multi-UAV continuous movement control method for energy efficient communication coverage, including:

determining observation information at a current moment, the observation information comprising one or more of the following information: energy consumption information of a UAV, coverage indication information of users covered by a UAV network facilitated by the UAV or coverage fairness information of the UAV network;

determining control information corresponding to the observation information using a deep deterministic policy gradient (DDPG) model according to the observation information, where the DDPG model is generated from a DDPG algorithm with sample information as an input, the sample information indicating a mapping relationship between sampled observation information (a subset of the observation information) and sampled control information (a subset of the control information); and controlling the UAV to move according to the control information.

In a possible design, a reward function of the DDPG model includes one or more of the following parameters: a total quality-of-service (QoS) requirement parameter of users at the current moment, a coverage fairness parameter of the UAV network at the current moment, and an energy consumption parameter of UAVs from a last moment to the current moment.

In a possible design, the reward function fulfils Eq. (1) below:

$$r_t = \frac{f_t \sum_{k=1}^{K} \sum_{i_k \in U_k} b_{t,i_k}^{(k)} C_k^{th}}{\sum_{j \in J} e_{t-1,j}(m_{t-1,j})} \quad (1)$$

where $r_t$ is the reward function of the DDPG model at a moment $$t, \sum_{k=1}^{K} \sum_{i_k \in U_k} b_{t,i_k}^{(k)} C_k^{th}$$

represents a total QoS requirements of users at the moment t, $f_t$ is a coverage fairness index of the UAV network at the moment t, and $$\sum_{j \in J} e_{t-1,j}(m_{t-1,j})$$

is me rum energy consumption of all UAVs from the moment t−1 to the moment t.

Further, $b_{t,i_k}^{(k)} = \max_{j \in J}\{b_{t,i,j}^{(k)}\}$, indicates whether a user $u_{i_k}^{(k)}$ in a set $U_k$ is covered at the moment t, $C_k^{th}$ is a QoS requirement threshold of the users in $U_k$, and $e_{t-1,j}(m_{t-1,j})$ is energy consumption of a UAV j from a moment t−1 to the moment t.

Further, t is a moment, and t=1, 2, . . . , T, which partitions a full period of time into T time steps, each time step begins from a moment, j is a UAV, J is a set that represents all UAVs with j∈J, the set $U_k$ is a k-th subset of a full set of users in the UAV network, wherein k=1, . . . , K, and all users in the $U_k$ have the same QoS requirement, further, the full set of users comprises all users in the UAV network, and comprises K subsets, and the QoS requirements of any two of the subsets are different.

In a possible design, the QoS requirement $C_k^{th}$ of a user in the set $U_k$ satisfies Eq. (2) below:

$$C_{t,i,j}^{(k)} \geq C_k^{th} + M_1(b_{t,i_k}^{(k)} - 1) \quad (2)$$

where $C_{t,i,j}^{(k)}$ is a QoS of a user $i_k$ in the set $U_k$ provided by the j-th UAV at a moment t, $M_1$ is a constant that is marginally greater than the maximum $C_k^{th}$, $C_k^{th}$ is a QoS requirement threshold of users in the set $U_k$, $b_{t,i_k}^{(k)} = \max_{j \in J}\{b_{t,i,j}^{(k)}\}$ represents whether a user $u_{i_k}^{(k)}$ in the set $U_k$ is covered at the moment t.

In a possible design, the method also includes: updating the reward function when any of the UAVs facilitating the UAV network is/are located at or beyond a boundary of a target airspace;

or/and, updating the reward function when connectivity is unattainable between any two UAVs in the UAV network, where the reward value determined by the updated reward function is smaller than that of the reward function before the updating.

In a possible design, the updating the reward function when any of the UAVs facilitating the UAV network is/are located at or beyond a boundary of a target airspace includes:

updating the reward function when a UAV is located at or beyond the boundary of the target airspace using Eq. (3) below:

$$r_t = r_t - (\alpha((l_x^+)^2 + (l_y^+)^2 + (l_h^+)^2) + \beta) |r_t = \qquad (3)$$

where $\alpha = 1/(12500|J|)$ and $\beta = 3/|J| - 9/(25|J|)$ are coefficients for adjusting the reward function, $|J|$ is the number of UAVs in the UAV network, and $$l_x^+ = \max\left(\left|x_{t,j} - \frac{x_l + x_u}{2}\right| - \frac{v_1}{2}(x_u - x_l), 0\right)$$

$$l_y^+ = \max\left(\left|y_{t,j} - \frac{y_l + y_u}{2}\right| - \frac{v_1}{2}(y_u - y_l), 0\right)$$

$$l_h^+ = \max\left(\left|h_{t,j} - \frac{h_l + h_u}{2}\right| - \frac{v_1}{2}(h_u - h_l), 0\right).$$

Further, $x_{t,j}$ is the longitude of a j-th UAV at moment t, $y_{t,j}$ is the latitude of the j-th UAV at moment t, $h_{t,j}$ is the altitude of the j-th UAV at moment t, $x_l$ is the minimum value of $x_{t,j}$, $x_u$ is the maximum value of the $x_{t,j}$, $y_l$ is the minimum value of $y_{t,j}$, $y_u$ is the maximum value of $y_{t,j}$, $h_l$ is the minimum value of $h_{t,j}$, $h_u$ is the maximum value of $h_{t,j}$, and $v_1$ is a constant.

In a possible design, the reward function fulfils a condition represented by Eq. (4) below:

$$\underset{x_{t,j}, y_{t,j}, h_{t,j}, m_{t-1,j}, \{b_{t,i_k}^{(k)}\}}{\text{maximize}} \frac{\sum_{t=1}^{T} \sum_{k=1}^{K} \sum_{i_k=1}^{|U_k|} f_t b_{t,i_k}^{(k)} C_k^{th}}{\sum_{t=1}^{T} \sum_{j \in J} e_{t-1,j}(m_{t-1,j})} \qquad (4)$$

where the constraints of the Eq. (4) are as follows: $C_{t,i,j}^{(k)} \geq C_k^{th} + M_1(b_{t,i_k}^{(k)} - 1)$ is fulfilled, and the UAV network has connectivity, and all UAVs in the UAV network are within a target airspace, and a movement distance $m_{t-1,j}$ of the j-th UAV from a moment t-1 to the moment t is no more than the maximum movement distance between the two moments.

In a second aspect, an embodiment of this disclosure provides a multi-UAV continuous movement control apparatus for energy efficient communication coverage, including:

an observation information determination module, configured to determine observation information at a current moment, the observation information comprising one or more of the following information: energy consumption information of a UAV, coverage indication information of users covered by a UAV network facilitated by the UAV or coverage fairness information of the UAV network;

a control information determination module, configured to determine control information corresponding to the observation information using a deep deterministic policy gradient (DDPG) model according to the observation information, wherein the DDPG model is generated from a DDPG algorithm with sample information as an input, the sample information indicating a mapping relationship between sampled observation information (a subset of the observation information) and sampled control information (a subset of the control information); and a control module, configured to control the UAV to move according to the control information.

In a third aspect, an embodiment of this disclosure provides a multi-UAV continuous movement control device for energy efficient communication coverage, including at least a processor and a memory, where:

the memory is configured to store computer executable instructions; and the at least a processor executes the computer executable instructions stored in the memory, causing the processor to execute a method according to the aforementioned first aspect.

In a fourth aspect, an embodiment of this disclosure provides a computer readable storage medium, storing computer executable instructions which, when executed by a processor, implements a multi-UAV continuous movement control method for energy efficient communication coverage according to the aforementioned first aspect and various possible designs of the first aspect.

According to the multi-UAV continuous movement control method, apparatus, device, and storage medium for energy efficient communication coverage provided in various embodiment of this disclosure, observation information at a current moment is determined, the observation information comprising one or more of the following information: energy consumption information of a UAV, coverage indication information of users covered by a UAV network facilitated by the UAV or coverage fairness information of the UAV network; and control information corresponding to the observation information is determined using a deep deterministic policy gradient (DDPG) model according to the observation information, where the DDPG model is generated from a DDPG algorithm with sample information as an input, the sample information indicating a mapping relationship between sampled observation information (a subset of the observation information) and sampled control information (a subset of the control information). Since the value of the mobile policy determined by the DDPG model is continuous; the problem of imprecise movement control for the UAVs resulting from the discrete nature in evaluating the mobile policy can be mitigated.

BRIEF DESCRIPTION OF THE DRAWINGS

To illustrate technical solutions of embodiments of this disclosure or prior art more clearly, now a brief introduction will be given to the accompanying figures that will be needed in describing the embodiments or prior art. Apparently, the following described figures are merely some embodiments of this disclosure. For those of ordinary skill in the art, other figures can still be derived from these figures without paying any creative labor.

DETAILED IMPLEMENTATION OF THE EMBODIMENTS

In order to make objectives, technical solutions and advantages of embodiments of the present disclosure clearer, the technical solutions in the embodiments of the present disclosure will be described hereunder clearly and comprehensively with reference to accompanying drawings. Apparently, the described embodiments are only a part of embodiments of the present disclosure, rather than all of them. Any and all other embodiments obtained by those of ordinary skill in the art based on the presently disclosed embodiments without making any creative effort shall fall into the protection scope of the present disclosure.

Figure 1:
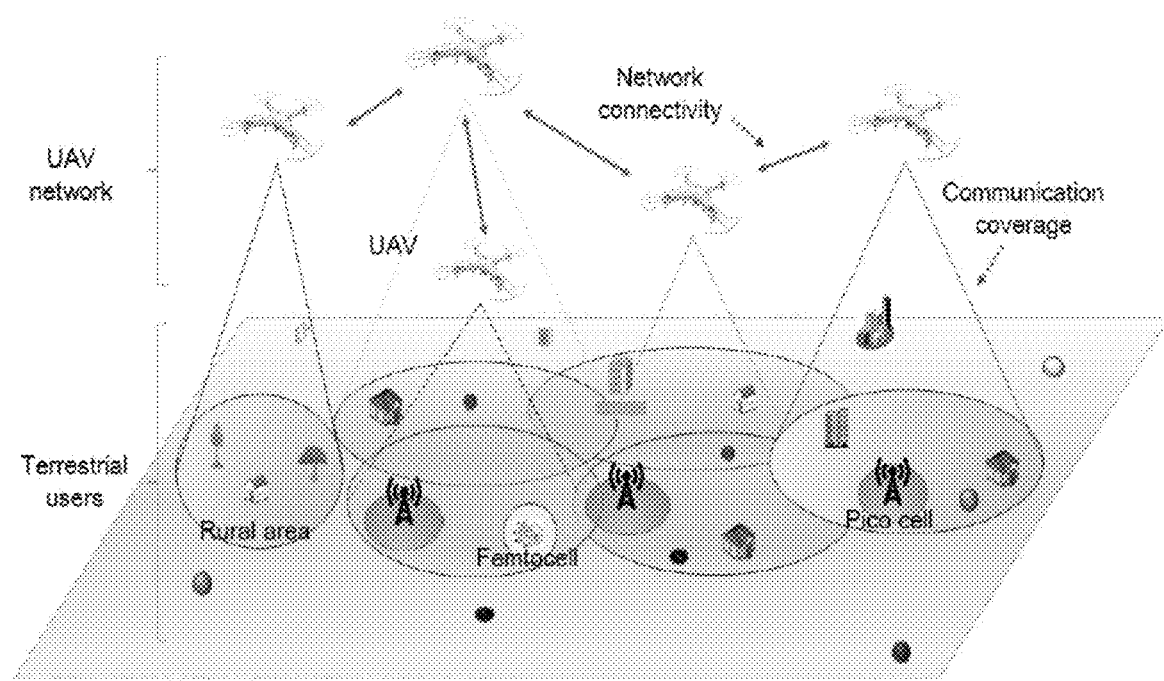
FIG. 1 is a schematic diagram illustrating a scenario of UAV deployment and communications provided by an embodiment of this disclosure.

FIG. 1 is a schematic diagram illustrating a scenario of UAV deployment and communications provided by an embodiment of this disclosure. In FIG. 1, a number of UAVs equipped with telecommunication service devices are deployed in airspace. These UAVs are used to provide communication services for users on the ground. Moreover, the communication service coverage area of each UAV is limited. As the QoS requirements of the terrestrial users are different, the UAVs have to move in the airspace. After the movement, the scope of the communication service coverage of the UAVs will change, thus providing better communication service to the terrestrial users.

Specifically, a controller may issue movement control information to the UAVs in the airspace. The controller can acquire observation information at the present moment in real-time, calculate the movement control information of the UAVs quickly, and send the movement control information to the UAVs, causing the UAVs to move according to the movement control information. After the movement, the UAVs stay stationary in the airspace, continuing to provide communication service. At a next moment, the controller calculates new movement control information for the UAVs according to latest observation information, and sends the new movement control information to the UAVs, causing the UAVs to make new movements according to the new movement control information. After the new movement, the UAVs again stay stationary in the airspace, still continuing to provide communication service. At the following moments, the controller and the UAVs will work according to the manners described with regard to the foregoing two moments.

Further, the controller may be a UAV in the airspace or a control device on the ground. When the controller is a UAV in the airspace, it typically need to be better equipped, i.e., with higher processing performance, communication capacity, and storage capacity. When the controller is a control device on the ground, it should also be better equipped in order to guarantee real-time communication between the device and the UAVs.

Figure 2:
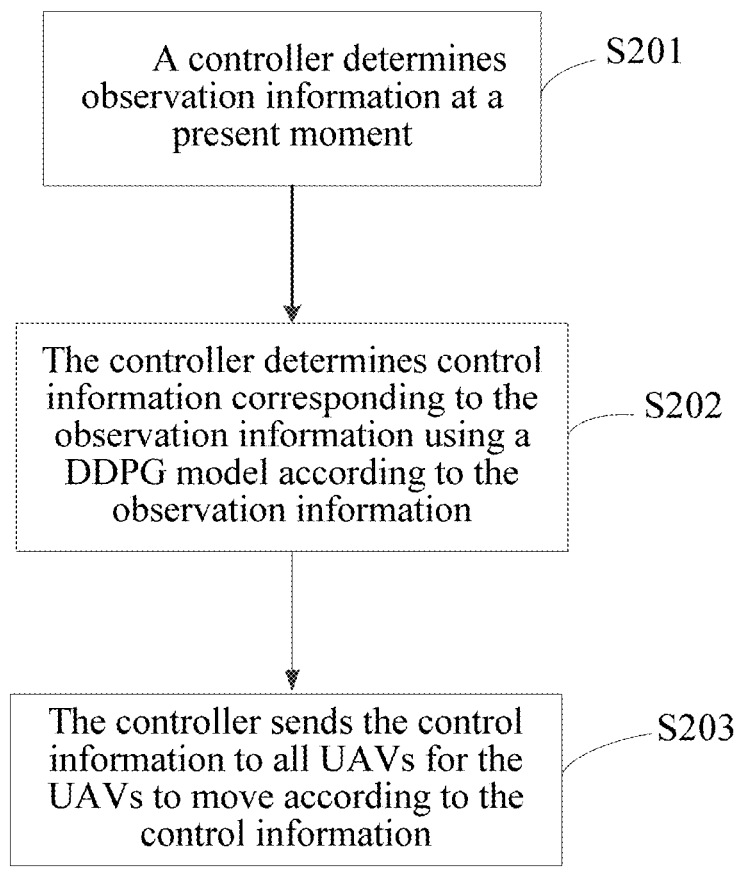
FIG. 2 is a first flowchart illustrating a multi-UAV continuous movement control method for energy efficient communication coverage provided by an embodiment of this disclosure.

FIG. 2 is a first flowchart illustrating a multi-UAV continuous movement control method for energy efficient communication coverage provided by an embodiment of this disclosure. The execution body of the embodiment can be a UAV or a ground control device, which will not be specifically restricted herein. The embodiment will from now on refer to the execution body as a controller. As is shown in FIG. 2, the method includes:

S201: a controller determines observation information at a present moment.

In this step, the observation information includes one or more of the following information: energy consumption information of a UAV, coverage indication information of users covered by a UAV network facilitated by the UAV or coverage fairness information of the UAV network.

This embodiment assumes that there are $|J|$ UAVs in the UAV network. A j-th UAV may be denoted as j, where $j \in J$. Assuming that all users in the UAV network forms a full set of users U that consists of K subsets of users, the QoS requirements of any two subsets are different, and $U_k$ is the k-th subset of users in the U. Users in the same $U_k$ have the same QoS requirement, where $k \in \{1, \ldots, K\}$. Further, $u_{i_k}^{(k)}$ denotes the $i_k$-th user in the $U_k$. Further, the embodiment partitions a period of time by a specific time step, where each time step begins from and at a moment. For example, the moment t is where the t-th time step begins.

The energy consumption information of a UAV potentially included in the observation information can be determined as the following:

$$e_{t-1,j}(m_{t-1,j}) = \frac{m_{t-1,j}}{m_{max}}(e_r - 1)e_h + e_h \qquad (1)$$

In Eq. (1), $e_{t-1,j}(m_{t-1,j})$ denotes the energy consumption of the j-th UAV from the last moment t−1 to the present moment t, $m_{t-1,j}$ is the movement distance of the UAV from the last moment t−1 to the present moment t, $m_{max}$ denotes the maximum movement distance between two moments, $e_r$ denotes a ratio of the UAVs' energy consumptions of covering the maximum distance versus hovering at its current location between two adjacent moments, and $e_h$ is the energy consumption of hovering at the current location. In addition, this disclosure sets $m_{0,j}=0$, so that $e_{0,j}(m_{0,j})=e_h$ represents the initial energy consumption of the j-th UAV.

The coverage indication information of users in the UAV network provided by the UAVs, which is potentially included in the observation information, can be determined by $b_{t,i_k}^{(k)}$ which indicates whether an $i_k$-th user $u_{i_k}^{(k)}$ of the set $U_k$ can be served at the moment t.

Optionally, $b_{t,i_k}^{(k)}=1$ when a user $u_{i_k}^{(k)}$ is covered by one or more UAVs, or $b_{t,i_k}^{(k)}=0$ when otherwise.

Further optionally, when the user $u_{i_k}^{(k)}$ is covered by one or more UAVs, there must be at least one UAV (e.g., a j-th UAV) facilitating serving the user $u_{i_k}^{(k)}$ with a QoS greater than or equal to a QoS requirement threshold of the user $u_{i_k}^{(k)}$. This may be represented as the following:

$$C_{t,i_kj}^{(k)} \geq C_k^{th} + M_1(b_{t,i_k}^{(k)} - 1) \qquad (2)$$

In Eq. (2), $C_{t,i_kj}^{(k)}$ is the QoS provided to the user $u_{i_k}^{(k)}$ by the j-th UAV at the moment t, $C_k^{th}$ is the QoS requirement threshold of the user $u_{i_k}^{(k)}$, $M_1$ is a constant that is marginally greater than the maximum $C_k^{th}$, and $b_{t,i_k}^{(k)} = \max_{j \in J}\{b_{t,i_kj}^{(k)}\}$.

This embodiment adopts receiving data rate to represent the QoS requirements of the users. According to the Shannon equation, the receiving data rate of a user $u_{i_k}^{(k)}$ can take the following form:

$$C_{t,i_kj}^{(k)} = B_w \log_2(1 + SNR_{i_kj}^{(k)}) \quad (3)$$

In Eq. (3), $B_w$ denotes the transmission bandwidth allocated to $u_{i_k}^{(k)}$ by the j-th UAV at moment t, and $SNR_{t,i_kj}^{(k)}$ denotes the received signal-to-noise ratio of the user $u_{i_k}^{(k)}$ when the user receives services provided by the j-th UAV at the moment t, which can be represented by the equation below:

$$SNR_{t,i_kj}^{(k)} = 10^{\frac{P_t - L_{t,i_kj}^{(k)}(h_{t,j}, r_{t,i_kj}^{(k)}) - P_N}{10}} \quad (4)$$

In Eq. (4), $P_N$ (in dBm) is the noise power, $P_t$ is the transmit power of a UAV, $L_{t,i_kj}^{(k)}(h_{t,j}, r_{t,i_kj}^{(k)})$ denotes the air-to-ground link propagation loss between the j-th UAV and a user at moment t without considering the users' height and the antenna heights of both users and UAVs, and $L_{t,i_kj}^{(k)}(h_{t,j}, r_{t,i_kj}^{(k)})$ can be represented by the equation below:

$$L_{t,i_kj}^{(k)}(h_{t,j}, r_{t,i_kj}^{(k)}) = \quad (5)$$

$$20\log_{10}\left(\frac{4\pi f_c}{c}\sqrt{h_{t,j}^2 + (r_{t,i_kj}^{(k)})^2}\right) + P_r(L_{t,i_kj}^{LoS})\eta_{LoS} + P_r(L_{t,i_kj}^{NLoS})\eta_{NLoS}$$

In Eq. (5), $f_c$ represents the carrier frequency by which a j-th UAV provides the communication service, $h_{t,j}$ is the altitude of the j-th UAV at the moment t, $r_{t,i_kj}^{(k)}$ is the horizontal distance between the user $u_{i_k}^{(k)}$ and the j-th UAV at the moment t, $P_r(L_{t,i_kj}^{LoS})$ is the probability of line-of-sight (LoS) propagation being established between the user $u_{i_k}^{(k)}$ and the j-th UAV at the moment t, $P_r(L_{t,i_kj}^{NLoS})$ is the probability of non line-of-sight (NLoS) propagation being established between the user $u_{i_k}^{(k)}$ and the j-th UAV at the moment t, and $\eta_{LoS}$ (in dB) and $\eta_{NLoS}$ (in dB) are environment parameters that denote transmission losses corresponding to LoS transmission and NLoS transmission, respectively.

Further, $r_{t,i_kj}^{(k)}$ in Eq. (5) can be calculated as the following:

$r_{t,i_kj}^{(k)} = \sqrt{(x_{i_k}^{(k)} - x_{t,j})^2 + (y_{i_k}^{(k)} - y_{t,j})^2}$, where $x_{i_k}^{(k)}$ is the longitude of the user $u_{i_k}^{(k)}$ at the moment t, $x_{t,j}$ is the longitude of the j-$^{th}$ UAV at the moment t, $y_{i_k}^{(k)}$ is the latitude of the user $u_{i_k}^{(k)}$ at the moment t, and $y_{t,j}$ is the latitude of the j-th UAV at the moment t.

Further, $P_r(L_{t,i_kj}^{LoS})$ in Eq. (5) can be calculated as the following:

$$P_r(L_{t,i_kj}^{LoS}) = \frac{1}{1 + \lambda_1 \exp(-\lambda_2(\theta_{t,i_kj}^{(k)} - \lambda_1))},$$

where $\lambda_1$ and $\lambda_2$ are two constants depending on environment type (such as rural, suburban and urban areas), $\theta_{t,i_kj}^{(k)}$ is the elevation angle between the user $u_{i_k}^{(k)}$ and the j-th UAV and can be calculated as:

$$\theta_{t,i_kj}^{(k)} = \frac{180}{\pi}\arctan\left(\frac{h_{t,j}}{r_{t,i_kj}^{(k)}}\right),$$

where the two parameters $h_{t,j}$ and $r_{t,i_kj}^{(k)}$ have the same meaning and calculation method as the above Eq. (5).

Further, $P_r(L_{t,i_kj}^{NLoS})$ in Eq. (5) can be calculated as the following:

$P_r(L_{t,i_kj}^{NLoS}) = 1 - P_r(L_{t,i_kj}^{LoS})$ where the calculation method of $P_r(L_{t,i_kj}^{NLoS})$ is the same as in the last step.

Besides, Eq. (5) may be calculated equivalently as:

$$L_{t,i_kj}^{(k)}(h_{t,j}, r_{t,i_kj}^{(k)}) = 20\log_{10}(\sqrt{h_{t,j}^2 + (r_{t,i_kj}^{(k)})^2}) + EP_r(L_{t,i_kj}^{LoS}) + F$$

where E and F are constants, with and $E = \eta_{LoS} - \eta_{NLoS}$ $$F = 20\log_{10}\left(\frac{4\pi f_c}{c}\right) + \eta_{NLoS}.$$

The network coverage fairness information, which is potentially included in the observation information, reflects information about the fairness of UAV coverage in the UAV network, and can be determined by the Jain's fairness index. Specifically, the network coverage fairness information of the UAV network can be calculated by:

$$f_t = \frac{\left(\sum_{k \in K}\sum_{i_k=1}^{|U_k|} \bar{b}_{t,i_k}^{(k)}\right)^2}{|U|\sum_{k \in K}\sum_{i_k=1}^{|U_k|} (\bar{b}_{t,i_k}^{(k)})^2},$$

where $f_t$ denotes the network coverage fairness information of the UAV network, $\bar{b}_{t,i_k}^{(k)}$ is the probability of user $u_{i_k}^{(k)}$ being covered at moment t, $|U_k|$ represents the number of users in $U_k$, $|U|$ denotes the number of users in the full set of users U. Further, $\bar{b}_{t,i_k}^{(k)}$ can be calculated by:

$$(\bar{b}_{t,i_k}^{(k)}) = \frac{\sum_{\tau=1}^{t} b_{\tau,i_k}^{(k)}}{T}.$$

S202: the controller determines control information corresponding to the observation information using a deep deterministic policy gradient (DDPG) model according to the observation information, wherein the DDPG model is generated from a DDPG algorithm with sample information as an input, the sample information indicating a mapping relationship between sampled observation information (a subset of the observation information) and sampled control information (a subset of the control information).

The control information may include one or more of the following information: pitch angle of a UAV, heading angle of a UAV, and movement distance of a UAV.

Optionally, the pitch angle of the j-th UAV when the UAV starts to move at moment t may be denoted by $\theta_{t,j}$, where $\theta_{t,j} \in [0°, 180°]$; the heading angle of the j-th UAV when the UAV starts to move at moment t is denoted by $\phi_{t,j}$, where $\phi_{t,j} \in (0°, 360°]$; the movement distance the j-th UAV is to traverse after the UAV starts to move at moment t can be denoted by $m_{t,j}$, where $m_{t,j} \in [0, m_{max}]$, $m_{max}$ being the maximum movement distance between two moments. If a UAV receives a movement distance $m_{t,j}=0$, then the UAV will hover at the current position in airspace.

S203: the controller sends the control information to all UAVs for the UAVs to move according to the control information.

When a UAV arrives at a new position in airspace, the UAV will send collected information to the controller, and the controller will determine observation information for a next moment according to the information received.

The value of the mobile policy determined by the DDPG model adopted by the multi-UAV continuous movement control method for energy efficient communication coverage in this disclosure is continuous; thus mitigating the problem where movement control is inaccurate because mobile policy is evaluated discretely.

Figure 3:
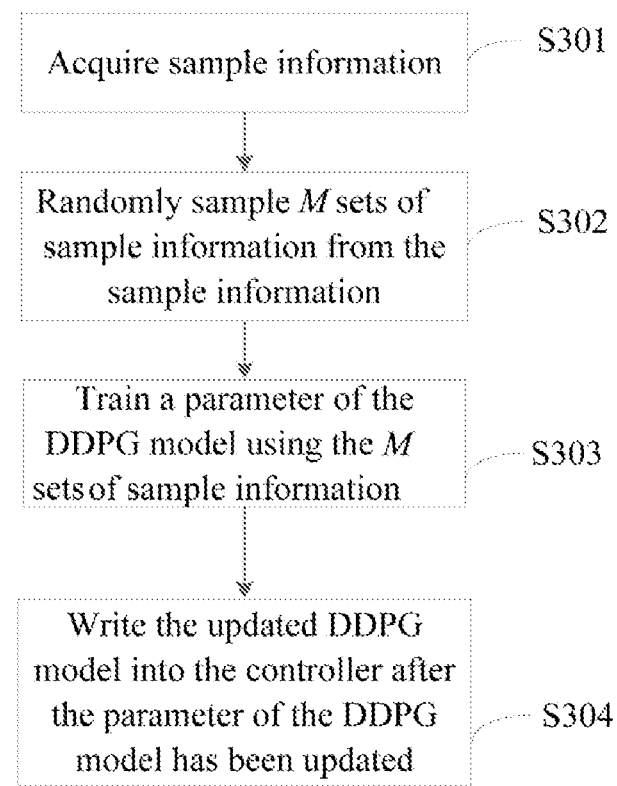
FIG. 3 is a second flowchart illustrating a procedure of a multi-UAV continuous movement control method for energy efficient communication coverage provided by an embodiment of this disclosure.

FIG. 3 is a second flowchart illustrating a procedure of a multi-UAV continuous movement control method for energy efficient communication coverage provided by an embodiment of this disclosure. The execution body of the embodiment can be a server or a desktop of higher capacity, which will not be specifically limited herein. On the basis of the embodiment in FIG. 2, this embodiment describes the generation process of the DDPG model involved in FIG. 2 in detail. As shown in FIG. 3, this method includes:

S301: acquire sample information.

A sample can be a four-tuple that includes observation information, control information, reward value, and observation information at the next moment. For example, $(s_t, a_t, r_t, s_{t+1})$ denotes a sample information, where $s_t$ is the observation information at moment t, $a_t$ is the control information determined by a policy function at moment t, $r_t$ is the reward value obtained at moment t after implementing the control information $a_t$, and $s_{t+1}$ is the observation information at the next moment t+1 after implementing the control information $a_t$.

S302: randomly sample M sets of sample information from the sample information.

S303: train a parameter of the DDPG model using the M sets of sample information.

Specifically, the DDPG model includes a critic evaluation network $Q(s,a|\theta^Q)$, an actor evaluation network $\mu(s|\theta^\mu)$, a critic target network $Q'(s,a|\theta^{Q'})$, and an actor target network $\mu'(s|\theta^{\mu'})$, where s is observation information, a is control information, $\theta^Q$ is a parameter of the critic evaluation network $Q(s,a|\theta^Q)$, $\theta^\mu$ is a parameter of the actor evaluation network $\mu(s|\theta^\mu)$, $\theta^{Q'}$ is a parameter of the critic target network $Q'(s,a|\theta^{Q'})$, and $\theta^{\mu'}$ is a parameter of the actor target network $\mu'(s|\theta^{\mu'})$. Further, the input of the critic evaluation network $Q(s,a|\theta^Q)$ can be the observation information s and the control information a, the output of the critic evaluation network $Q(s,a|\theta^Q)$ can be a Q value. The input of the critic target network $Q'(s,a|\theta^{Q'})$ can be the observation information s and the control information a, the output of the critic target network $Q'(s,a|\theta^{Q'})$ can be a Q value. The input of the actor evaluation network $\mu(s|\theta^\mu)$ can be the observation information s, the output of the actor evaluation network $\mu(s|\theta^\mu)$ can be the control information a. The input of the actor target network $\mu'(s|\theta^{\mu'})$ can be the observation information s, the output of the actor target network $\mu'(s|\theta^{\mu'})$ can be the control information a. Further, the Q value may represent a future reward obtainable by implementing the control information a when the observation information is the s. Specifically, the Q value can be calculated as the following:

$$y_t = r(s_t, a_t) + \gamma Q(s_{t+1}, \mu(s_{t+1})|\theta^Q)$$

Optionally, the critic evaluation network $Q(s,a|\theta^Q)$, the actor evaluation network $\mu(s|\theta^\mu)$, the critic target network $Q'(s,a|\theta^{Q'})$ and the actor target network $\mu'(s|\theta^{\mu'})$ are all two-layer and fully connected forward-propagation neural networks, that is, the forward-propagation neural networks include two hidden layers. There may be 400 neurons in the first hidden layer and 300 neurons in the second layer. The ReLU function may be used to activate these forward-propagation neural networks. The forward-propagation neural networks may employ $L_2$ weight delay to mitigate the phenomenon of overfitting. The learning rates of the actor evaluation network and the actor target network when updating their parameters may be set to 0.0001, and the learning rates of the critic evaluation network and the critic target network when updating their parameters may be set to 0.001.

Optionally, the parameters $\theta^Q$, $\theta^\mu$, $\theta^{Q'}$ and $\theta^{\mu'}$ may have the relationship as the following:

$$\theta^{Q'} = \tau\theta^Q + (1-\tau)\theta^{Q'} \qquad (6)$$

$$\theta^{\mu'} = \tau\theta^\mu + (1-\tau)\theta^{\mu'} \qquad (7)$$

where, $\tau$ in Eqs. (6) and (7) is a constant.

Optionally, the parameters $\theta^Q$, $\theta^\mu$, $\theta^{Q'}$ and $\theta^{\mu'}$ in the critic evaluation network $Q(s,a|\theta^Q)$, the actor evaluation network $\mu(s|\theta^\mu)$, the critic target network $Q'(s,a|\theta^{Q'})$ and the actor target network $\mu'(s|\theta^{\mu'})$ may have been updated when the samples are to be generated.

Optionally, $Q(s,a|\theta^Q)$ can be used to represent the output information of the critic evaluation network $Q(s,a|\theta^Q)$, $\mu(s|\theta^\mu)$ can be used to represent the output information of the actor evaluation network $\mu(s|\theta^\mu)$, and the M sets of samples $(s_m, a_m, r_m, s_{m+1})$ can be used to train the parameters $\theta^Q$, $\theta^\mu$, $\theta^{Q'}$ and $\theta^{\mu'}$ of the critic evaluation network $Q(s,a|\theta^Q)$, the actor evaluation network $\mu(s|\theta^\mu)$, the critic target network $Q'(s,a|\theta^{Q'})$ and the actor target network $\mu'(s|\theta^{\mu'})$, where $m \in \{1, \ldots, M\}$. Specifically, one may have $y_m = r_m + \gamma Q'(s_{m+1}, \mu'(s_{m+1}|\theta^{\mu'})|\theta^{Q'})$ and then update the parameter $\theta^Q$ by minimizing the loss $L(\theta^Q)$, where the minimum loss $L(\theta^Q)$ may be $$L(\theta^Q) = \frac{1}{M}\sum_{m=1}^{M}(y_m - Q(s_m, a_m)|\theta^Q)^2.$$

Meanwhile, the Eq. (6) can be used to update $\theta^{Q'}$, while $\theta^\mu$ can be updated by a gradient descend method. The equation of the gradient descend method can take the form:

$$\nabla_{\theta^\mu}\mu|_{s_m} = \frac{1}{M}\sum_{m=1}^{M}(\nabla_a Q(s,a|\theta^Q)|_{s=s_m, a=\mu(s_m|\theta^\mu)}\nabla_{\theta^\mu}\mu(s|\theta^\mu)|_{s=s_m}),$$

and $\theta^{\mu'}$ can be updated according to Eq. (7).

S304: write the updated DDPG model into the controller after the parameter of the DDPG model has been updated.

Figure 4:
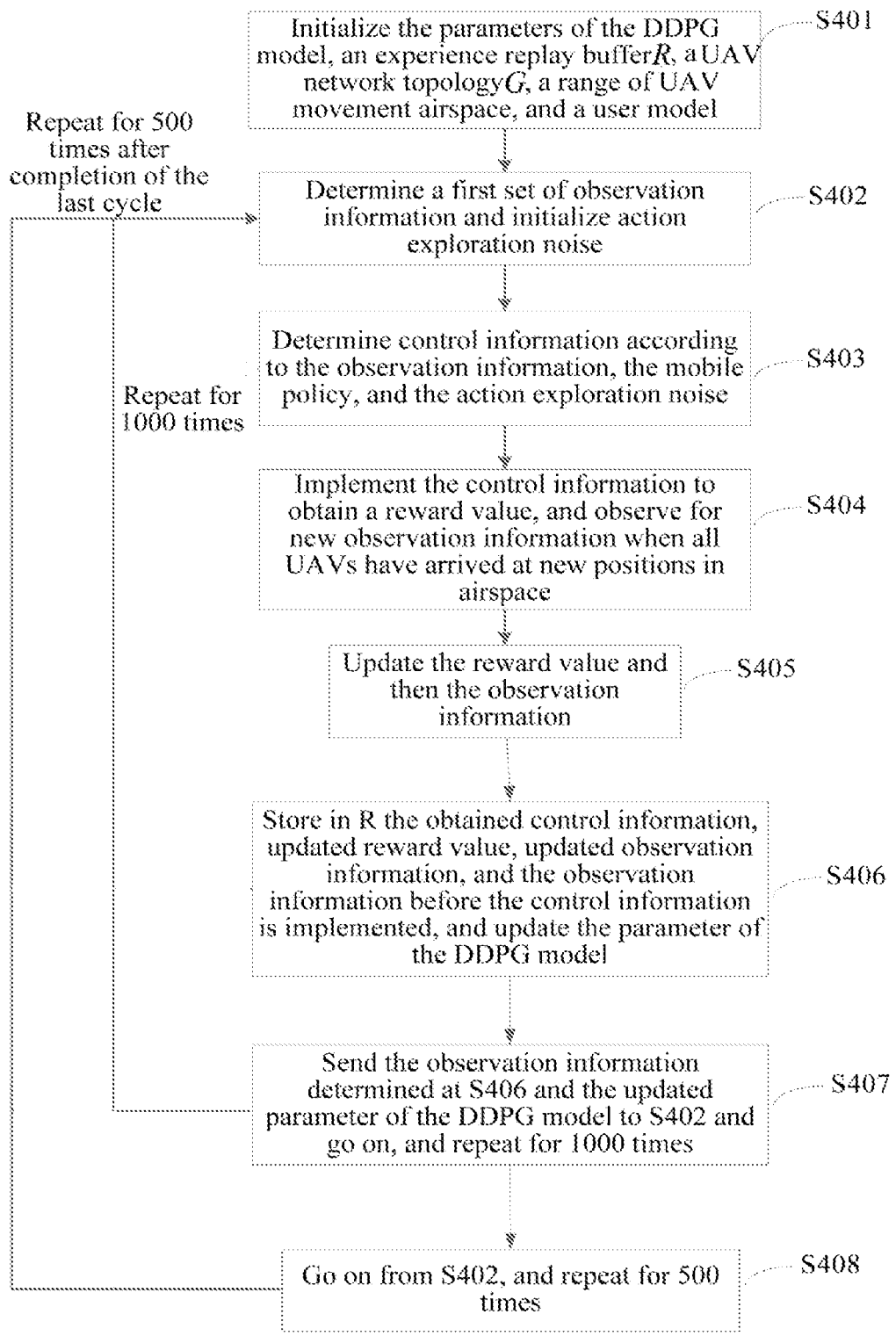
FIG. 4 is a third flowchart illustrating a procedure of a multi-UAV continuous movement control method for energy efficient communication coverage provided by an embodiment of this disclosure.

FIG. 4 is a third flowchart illustrating a procedure of a multi-UAV continuous movement control method for energy efficient communication coverage provided by an embodiment of this disclosure. The execution body of the embodiment can be a server or a desktop of higher capacity, which will not be specifically limited herein. On the basis of the embodiment in FIG. 3, this embodiment describes the generation process of the sample information used in FIG. 3 in detail. As shown in FIG. 4, this method includes:

S401: initialize the parameters of the DDPG model, an experience replay buffer R, a UAV network topology G, a range of UAV movement airspace, and a user model.

Specifically, an Xavier initialization scheme can be used to initialize the parameters $\theta^Q$ and $\theta^\mu$ of the critic evaluation network $Q(s,a|\theta^Q)$ and the actor evaluation network $\mu(s|\theta^\mu)$.

Specifically, the following methods can be used to initialize the UAV network topology G and the range of UAV movement airspace:

Firstly, initialize the positions of UAVs in airspace, e.g., assume J is a set of initialized UAVs. Then, initialize a target airspace range of UAV movement, i.e., the UAVs are only allowed to move within the airspace. Then, construct the UAV topology G according to the airspace positions of the UAVs. Specifically, each UAV in the UAV set J can be considered as a vertex in the diagram G. Assuming that V(G) is a set of vertexes in the UAV topology diagram G, and if there is a connectable space-to-space link between any two vertexes in the UAV network topology, then there is a connection line between the two vertexes. The edges of the UAV network topology are constructed by all of the connection lines, and assume that E(G) is the set of the edges of the UAV network topology. Further, for any two vertexes j, j'∈V(G), if there is a path from j to j' in the UAV network topology G, the diagram G is referred to as a connected diagram; otherwise, G is referred to as a disconnected diagram.

Further, use the following method may be used to assess whether there is a connectable space-to-space link between any two vertexes in the UAV network topology.

Assuming there are any two vertexes, i.e., any two UAVs j and j', and assuming that the shadowing effect of the body of a UAV is neglected, then there is LoS (line of sight) propagation between the two UAVs j and j'. A free-space path loss model can be used to calculate the space-to-space link propagation loss, which is calculate by the following equation:

$$L_{t,jj'}(\omega_{t,j}, \omega_{t,j'}) = 20 \log_{10}\left(\frac{4\pi f_c}{c} d(\omega_{t,j}, \omega_{t,j'})\right)$$

where $L_{t,jj'}(\omega_{t,j},\omega_{t,j'})$ is the space-to-space link transmission loss between the two UAVs j and j', $f_c$ (in Hz) represents the carrier frequency, c (in meters per second) denotes the speed of light, $\omega_{t,j}$ is the position of the j-th UAV at moment t, $\omega_{t,j'}$ is the position of the j'-th UAV at moment t, $d(\omega_{t,j}, \omega_{t,j'})\|\omega_{t,j}-\omega_{t,j'}\|_2$ is the distance between the j-th UAV and the j'-th UAV. There is a connectable space-to-space link between the j-th and j'-th UAVs when and only when the link propagation loss $L_{t,jj'}(\omega_{t,j},\omega_{t,j'})$ is less than or equal to a transmission loss threshold $\gamma_1$.

Optionally, the initializing the user model may include initializing a physical position of a user, and a QoS requirement threshold $C_k^{th}$ of the user. Specifically, the QoS requirements threshold $C_k^{th}$ of the user may be initialized as the following.

Assuming $\rho_k$ is the probability that a user $u_{i_k}^{(k)}$ belongs to a set of users U, with $\rho_1+\rho_2+\ldots+\rho_K=1$, this embodiment utilizes a turntable game to establish the QoS requirements of each users. In the turntable game, each user is allowed to turn the turntable only once. If the turntable needle falls into an interval of $$\left[\sum_{t=1}^{k-1}\rho_t, \sum_{t=1}^{k}\rho_t\right] (2 \le k \le K),$$

the QoS requirement of the user $u_{i_k}^{(k)}$ may be set to $C_k^{th}$, and the user is added to the set of users $U_k$. If the turntable needle falls into an interval of $(0,\rho_1]$, the QoS requirement of the user may be set to $C_1^{th}$.

S402: determine a first set of observation information and initialize action exploration noise.

The first set of observation information may be determined using the method of determining observation information as described in S202 according to the initialized UAV positions in airspace and the initialized user model. Denote the first set of observation information by $s_1$, use Ornstein-Uhlenbeck process to determine a noise process N, the mean value of the noise is 0, and the variance is 0.3.

S403: determine control information according to the observation information, the mobile policy, and the action exploration noise.

Specifically, the observation information $s_1$ described in S402 is inputted to the actor evaluation network of and actor target network of the DDPG model in S402. The actor evaluation network determines the mobile policy for the UAVs. Assume that the mobile policy is $\mu(s_1|\theta^\mu)$, control information $a_1$ is determined according to the mobile policy $\mu(s_1|\theta^\mu)$ and the noise $N_1$ in S402. That is, $a_1=\mu(s_1|\theta^\mu)+N_1$.

S404: implement the control information to obtain a reward value, and observe for new observation information when all UAVs have arrived at new positions in airspace.

Implementing the control information $a_1$ determined at S403, the reward value $r_1$ can be obtained via the calculation as the following:

$$r_t = \frac{f_t \sum_{k=1}^{K} \sum_{i_k \in U_k} b_{t,i_k}^{(k)} C_k^{th}}{\sum_{j \in J} e_{t-1,j}(m_{t-1,j})}$$

The UAVs may arrive at new positions after moving according to the received control information $a_1$. At the new positions, the UAVs will see new observation information and send the information to the controller. Next, the controller obtains new observation information $s_2$ according to received observation information sent from the UAVs.

S405: update the reward value and then the observation information.

The reward value $r_1$ that had been obtained at S404 may be updated in the following manner, and then the observation information $s_2$ can also be updated.

After the UAVs have made the movements following the control information $a_1$, the reward function $r_1$ may be updated if a UAV is at or beyond the boundary of a target airspace. Further, after the UAVs have made the movements following the control information $a_1$, the reward function $r_1$ may again be updated if communication is unattainable between any two UAVs in the UAV network. Meanwhile, if a UAV would be outside of the target airspace should the UAVs make the movements following the control information $a_1$, this movement of the UAV will need to be cancelled, and the UAV will need to move back to its position before the movement, and the observation information about the UAV will need to be updated regarding the cancelled movement.

S406: store in R the obtained control information, updated reward value, updated observation information and the observation information before the control information is implemented, and update the parameter of the DDPG model.

Specifically, the observation information $s_1$ before implementing the control information is determined at S402, the control information $a_1$ is determined at S403, the updated reward value $r_1$ and the updated observation information $s_2$ are determined at S405, and the $s_1$, $a_1$, $r_1$ and $s_2$ are formed into a four-tuple that is to be stored in the R.

Optionally, a gradient descend method may be used to update the parameter of the DDPG model.

S407: send the observation information determined at S406 and the updated parameter of the DDPG model to S402 and go on, and repeat for 1000 times;

S408: go on from S402, and repeat for 500 times.

Figure 5A:
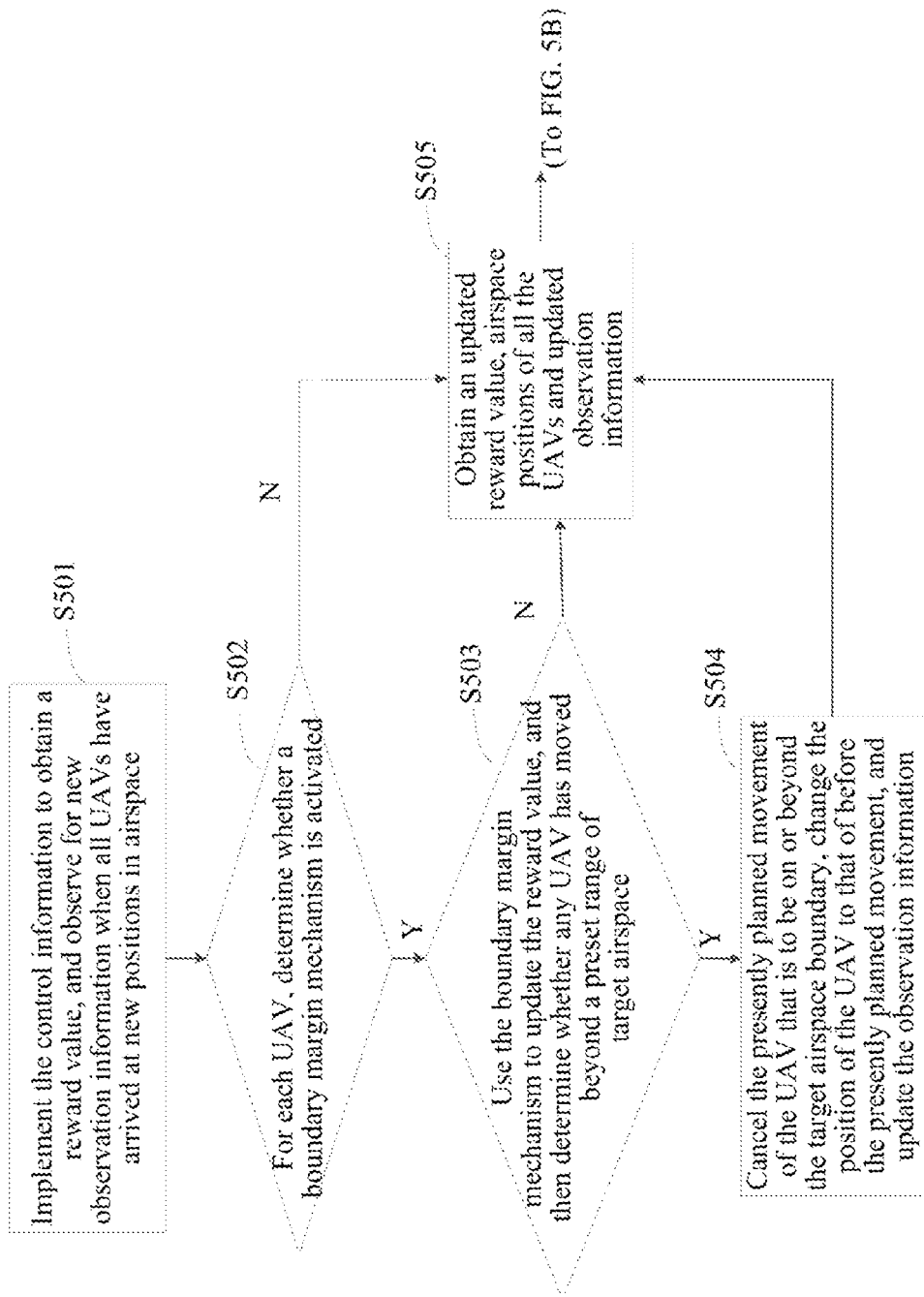
FIGS. 5A-5B form a fourth flowchart illustrating a procedure of a multi-UAV continuous movement control method for energy efficient communication coverage provided by an embodiment of this disclosure.
Figure 5B:
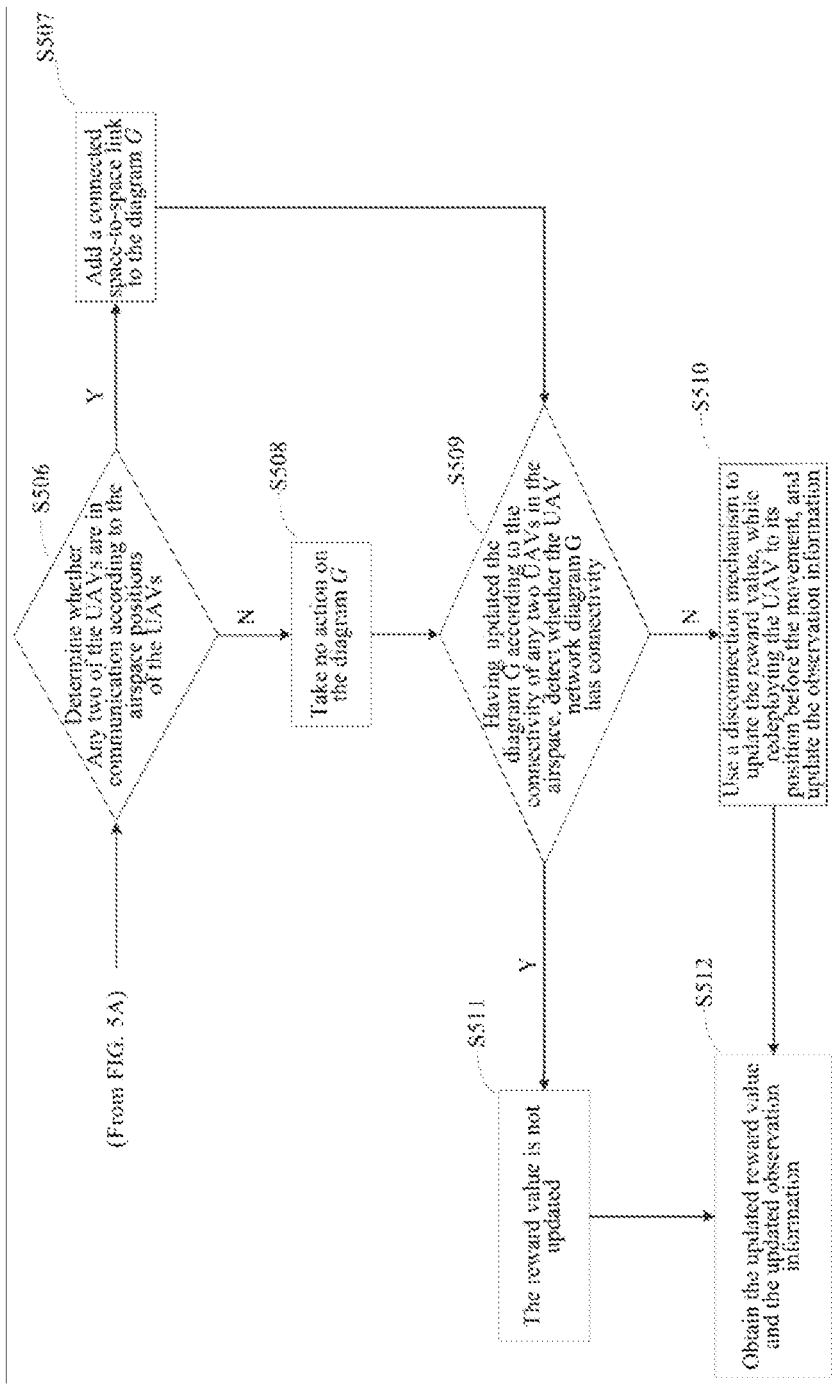

FIGS. 5A-5B form a fourth flowchart illustrating a procedure of a multi-UAV continuous movement control method for energy efficient communication coverage provided by an embodiment of this disclosure. The execution body of this embodiment can be a server or a desktop of higher capacity, which will not be specifically limited herein. On the basis of the embodiment in FIG. 4, this embodiment describes the details of the updating the reward value and then the observation information at S405 as shown in FIG. 4. As shown in FIGS. 5A-5B, this method includes:

S501: implement the control information to obtain a reward value, and observe for new observation information when all UAVs have arrived at new positions in airspace.

S502: for each UAV, determine whether a boundary margin mechanism is activated and, if not, go to S505; if yes, go to S503.

Specifically, whether a boundary margin mechanism is activated may be determined as the following.

Determine whether a UAV is on or beyond a target airspace boundary when the UAVs have arrived at their new positions, where the target airspace boundary is a new 3-dimensional airspace created by shrinking the range of the target airspace into which the UAV moves, where the shrinking is made by a ratio of $v_1$.

S503: use the boundary margin mechanism to update the reward value, and then determine whether any UAV has moved beyond a preset range of target airspace and; if no, go to S505; if yes, go to S504.

Optionally, use the following Eq. (8) to update the reward function:

$$r_t = r_t - (\alpha((l_x^+)^2 + (l_y^+)^2) + (l_h^+)^2) + \beta)|r_t| \qquad (8)$$

where $\alpha = 1/(12500|J|)$ and $\beta = 3/|J| - 9/(25|J|)$ are two coefficients used to adjust the reward function, $|J|$ is the number of UAVs in the UAV network, and, $$l_x^+ = \max\left(\left|x_{t,j} - \frac{x_l + x_u}{2}\right| - \frac{v_1}{2}(x_u - x_l), 0\right)$$

$$l_y^+ = \max\left(\left|y_{t,j} - \frac{y_l + y_u}{2}\right| - \frac{v_1}{2}(y_u - y_l), 0\right)$$

$$l_h^+ = \max\left(\left|h_{t,j} - \frac{h_l + h_u}{2}\right| - \frac{v_1}{2}(h_u - h_l), 0\right)$$

Further, $x_{t,j}$ is the longitude of the j-th UAV at moment t, $y_{t,j}$ is the latitude of the j-th UAV at moment t, $h_{t,j}$ is the altitude of j-th UAV at moment t, $x_l$ is the minimum value of $x_{t,j}$, $x_u$ is the maximum value of the $x_{t,j}$, $y_l$ denotes the minimum value of $y_{t,j}$, $y_u$ represents the maximum value of $y_{t,j}$, $h_l$ denotes the minimum value of $h_{t,j}$, $h_u$ is the maximum value of $h_{t,j}$, and $v_1$ is a constant.

S504: cancel the presently planned movement of the UAV that is to be on or beyond the target airspace boundary, change the position of the UAV to that of before the presently planned movement, and update the observation information;

S505: obtain an updated reward value, airspace positions of all the UAVs and updated observation information;

S506: determine whether any two of the UAVs are in communication according to the airspace positions of the UAVs and, if not, go to S508; if yes, go to S507;

S507: add a connected space-to-space link to the diagram G;

S508: no action is required on the diagram G;

S509: Having updated the diagram G according to the connectivity of any two UAVs in the airspace, detect whether the UAV network diagram G has connectivity and, if G has no connectivity, go to S510; if yes, go to S511.

Optionally, Dijkstra algorithm may be used to check whether any two UAVs have connectivity. For any j, j'∈J, if there is not any transmission path between the j-th and j'-th UAVs at a moment t, the UAV network has no connectivity at the moment t.

S510: use a disconnection mechanism to update the reward value, while redeploying the UAV to its position before the movement, and update the observation information.

Specifically, use the following equation to update the reward value: $r_t = r_t - v_2|r_t|$, where $v_2$? 1 is a larger coefficient. Moreover, the UAV need to cancel its presently planned movement and return to its airspace position before the movement. The observation information also needs to be updated.

S511: the reward value is not updated.

S512: obtain the updated reward value and the updated observation information.

The multi-UAV continuous movement control method for energy efficient communication coverage provided by the embodiment of this disclosure acquires sample information, from which M sets of sample information are randomly sampled. These M sets of sample information are used to train a parameter of a DDPG model. The parameter of the DDPG model is, after being updated, written to a controller. The multi-UAV continuous movement control method for energy efficient communication coverage provided by the embodiment of this disclosure can generate a huge volume of training data set during interacting with a random environment, and eliminating the need to prepare a massive training data set as its input.

Further, at the end of a training, the multi-UAV continuous movement control method for energy efficient communication coverage of the embodiment of this disclosure can be suitable for many new communication coverage scenarios. A learnt network model does not need re-training or reinforcement of the parameter when facing a new communication coverage scenario. Besides, the training process of the movement control method provided in the embodiment of this disclosure can be accomplished offline, offering less complexity for online implementation.

Figure 6:
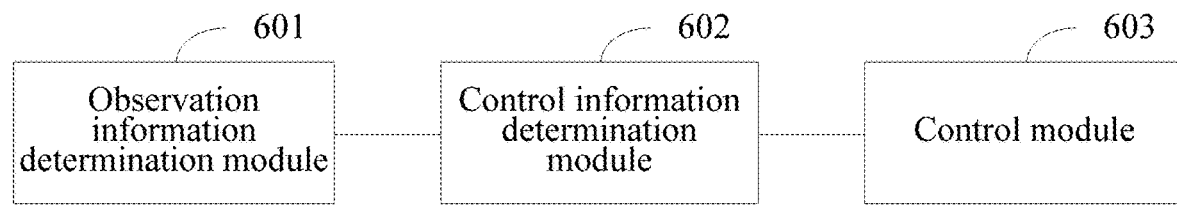
FIG. 6 is a schematic structural diagram illustrating a multi-UAV continuous movement control apparatus for energy efficient communication coverage provided by an embodiment of this disclosure.

FIG. 6 is a schematic structural diagram illustrating a multi-UAV continuous movement control apparatus for energy efficient communication coverage provided by an embodiment of this disclosure. As shown in FIG. 6, the movement control apparatus includes:

an observation information determination module 601, configured to determine observation information at a current moment, the observation information comprising one or more of the following information: energy consumption information of a UAV, coverage indication information of users covered by a UAV network facilitated by the UAV or coverage fairness information of the UAV network;

a control information determination module 602, configured to determine control information corresponding to the observation information using a deep deterministic policy gradient (DDPG) model according to the observation information, wherein the DDPG model is generated from a DDPG algorithm with sample information as an input, the sample information indicating a mapping relationship between sampled observation information (a subset of the observation information) and sampled control information (a subset of the control information); and a control module 603, configured to control the UAV to move according to the control information.

The multi-UAV continuous movement control device for energy efficient communication coverage provided by the embodiment may be used to implement the technical solution of the method embodiment shown in FIG. 2 with similar principles and technical effects, which will not be repeated herein.

Figure 7:
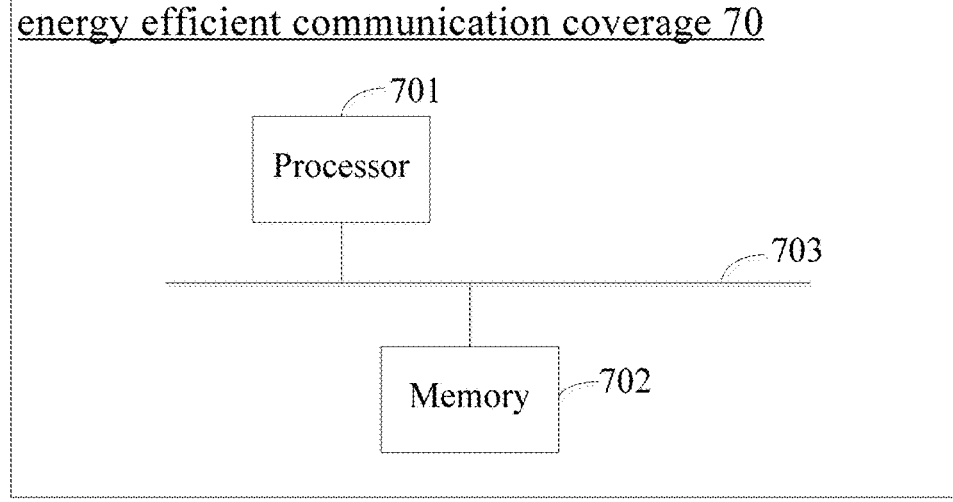
FIG. 7 is a schematic hardware block diagram illustrating a of a multi-UAV continuous movement control device for energy efficient communication coverage provided by an embodiment of this disclosure.

FIG. 7 is a schematic hardware block diagram illustrating a multi-UAV continuous movement control device for energy efficient communication coverage provided by an embodiment of this disclosure. As is shown in FIG. 7, the multi-UAV continuous movement control device for energy efficient communication coverage 70 provided by this embodiment includes:

a processor 701 and a memory 702, where:

the memory 702 is configured to store computer executable instructions; and the processor 701 executes the computer executable instructions stored in the memory, so as to implement various steps of the above-mentioned multi-UAV continuous movement control method for energy efficient communication coverage, the details of which may be seen in relevant descriptions in the aforementioned method embodiment.

Optionally, the memory 702 may be configured independently or integrated with the processor 701, which will not be limited in this embodiment.

When the memory 702 is configured independently, the multi-UAV continuous movement control device for energy efficient communication coverage may further include a bus 703 that is configured to connect the processor 701 and the memory 702.

An embodiment of this disclosure also provides a computer readable storage medium, storing computer executable instructions which, when executed by a processor, implements a multi-UAV continuous movement control method for energy efficient communication coverage described hereinabove.

In the several embodiments provided by the present disclosure, it should be understood that the disclosed device and method may be implemented in other manners. For example, the device embodiments described above are merely illustrative, e.g. the modules are categorized according to logical functions only, and other categories can be used in actual implementations. For instance, multiple modules may be combined or integrated into another system, or some features can be omitted or skipped. Moreover, an illustrated or discussed coupling or direct coupling or communication connection may be an indirect coupling or communicative connection an interface, device or module, and may be in electrical, mechanical, or other forms.

The modules described as separate members may be or may not be physically separated. The members shown as modules may be or may not be physical units, and may be located at the same place or may be distributed in multiple network elements. Some or all of the modules may be selected according to the actual needs for realizing the objectives of the solutions of the embodiments.

In addition, various functional modules in various embodiments of the present disclosure may be integrated into a single processing unit, or each module may be presented in physically separated forms, or two or more modules may be integrated into a single unit. The above-mentioned units, which are consists of modules, can be implemented in the form of a hardware or in the form of a hardware plus software functional units.

The above described integrated module, which is implemented in the form of software functional module, may be stored in a computer-readable storage medium. The above software functional module is stored in a storage medium and includes instructions for causing a computer device (which may be a personal computer, a server, or a network device and the like) or a processor to perform part of the steps in the methods of the various embodiments of the present disclosure.

It is to be understood that the processor may be a central processing unit (CPU) or other general-purpose processor, digital signal processor (DSP), and/or application specific integrated circuit (ASIC). The general-purpose processor may be a microprocessor or any conventional processor or the like. The steps incorporating the disclosed method of the disclosure may be directly reflected as the completion of the execution of the hardware processor or a completion of the execution using combined hardware and software modules in the processor.

The memory may include high speed RAM memory, and may also include non-volatile memory (NVM), such as at least one disk storage, or a USB flash drive, a removable hard disk, a read only memory, a magnetic disk, or an optical disk.

The bus may be an industry standard architecture (ISA) bus, a peripheral component interconnection (PCI) bus, or an extended industry standard architecture (EISA) bus or the like. The bus can be divided into an address bus, a data bus, a control bus, and so on. For ease of representation, the bus in figures accompanying the application is not limited to only one bus or one type of bus.

The above storage medium may be implemented by any type of volatile or non-volatile memory, or a combination thereof, e.g., static random access memory (SRAM), electrically erasable programmable read only memory (EEPROM), erasable in addition to programmable read only memory (EPROM), programmable read only memory (PROM), read only memory (ROM), magnetic memory, flash memory, disks or optical disks. The storage medium may be any available media that can be accessed by a general purpose or special purpose computer.

An exemplary storage medium is coupled to the processor to enable the processor to read information from, and write information to, the storage medium. Of course, the storage medium can also be a part of the processor. The processor and the storage medium may be located in application specific integrated circuits (ASIC). Of course, the processor and the storage medium can also exist as discrete components in an electronic device or a master device.

Persons of ordinary skill in the art may understand that, all or a part of steps of the foregoing method embodiments may be implemented by a program instructing relevant hardware. The program may be stored in a computer readable storage medium. When the program runs, the steps of the foregoing embodiment methods are performed. The foregoing storage medium includes various mediums capable of storing program codes, such as a ROM (read only memory), a RAM (random access memory), a magnetic disk, or an optical disc.

Finally, it should be noted that the above embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A multi-unmanned aerial vehicle (UAV) continuous movement control method for energy efficient communication coverage, comprising:
   determining observation information at a current moment, the observation information comprising one or more of the following information: energy consumption information of a UAV, coverage indication information of users covered by a UAV network facilitated by the UAV or coverage fairness information of the UAV network;
   determining control information corresponding to the observation information using a deep deterministic policy gradient (DDPG) model according to the observation information, wherein the DDPG model is generated from a DDPG algorithm with sample information as an input, the sample information indicating a mapping relationship between sampled observation information and sampled control information; and
   controlling the UAV to move according to the control information,
   wherein a reward function of the DDPG model comprises one or more of the following parameters:
   a total quality-of-service (QoS) requirement parameter of users at the current moment, a coverage fairness parameter of the UAV network at the current moment, and an energy consumption parameter of the UAV from a last moment to the current moment; and
   the reward function fulfils Eq. (1) below:

$$r_t = \frac{f_t A}{\sum_{j \in J} e_{t-1,j}(m_{t-1,j})} \quad (1)$$

wherein $r_t$ is the reward function of the DDPG model at a moment t, A is a total QoS requirement of users, $f_t$ is a coverage fairness index of the UAV network at the moment t, $$\sum_{j \in J} e_{t-1,j}(m_{t-1,j})$$

is a total energy consumption of all UAVs from a moment t−1 to the moment t, and wherein:
   the total QoS requirement of the users is based on receiving data rates of the users.

2. The method according to claim 1, wherein the total QoS requirement of the users A is specifically represented by $$\sum_{k=1}^{K} \sum_{i_k \in U_k} b_{t,i_k}^{(k)} C_k^{th},$$

wherein:
   $b_{t,i_k}^{(k)}$ indicates whether a user $u_{i_k}^{(k)}$ in a set $U_k$ is covered at the moment t, $C_k^{th}$ is a QoS requirement threshold of the users in $U_k$, and $e_{t-1,j}(m_{t-1,j})$ is energy consumption of a UAV$_j$ from the moment t−1 to the moment t;
   further, t is a moment, and t=1, 2, . . . T, which partitions a full period of time into T time steps, each time step begins from a moment, j is a UAV, j is a set that represents all UAVs with j∈J, the set $U_k$ is a k-th subset of a full set of users in the UAV network, wherein k=1, . . . , K, and all users in the $U_k$ have the same QoS requirement, further, the full set of users comprises all users in the UAV network, and comprises K subsets, and QoS requirements of any two of the subsets are different.

3. The method according to claim 2, wherein the QoS requirement $C_k^{th}$ of a user in the set $U_k$ satisfies Eq. (2) below:

$$C_{t,i_k j}^{(k)} \geq C_k^{th} + M_1(b_{t,i_k}^{(k)} - 1) \quad (2)$$

wherein $C_{t,i_k j}^{(k)}$ is a QoS of a user $i_k$ in the set $U_k$ provided by the j-th UAV at a moment t, $M_1$ is a constant that is marginally greater than the maximum $C_k^{th}$, $C_k^{th}$ is a QoS requirement threshold of users in the set $U_k$, $b_{t,i_k}^{(k)} = \max_{j \in J}\{b_{t,i_k j}^{(k)}\}$ represents whether a user $u_{i_k}^{(k)}$ in the set $U_k$ is covered at the moment t.

4. The method according to claim 2, further comprising: updating the reward function when any of the UAVs facilitating the UAV network is/are located at or beyond a boundary of a target airspace;
   and/or,
   updating the reward function when connectivity is unattainable between any two UAVs in the UAV network,
   wherein the reward value determined by the updated reward function is smaller than that of the reward function before the updating; and
   the updating the reward function when any of the UAVs facilitating the UAV network is/are located at or beyond a boundary of a target airspace comprises:
   updating the reward function when a UAV is located at or beyond the boundary of the target airspace using Eq. (3) below:

$$r_t = r_t - (\alpha((l_x^+)^2 + (l_y^+)^2 + (l_h^+)^2) + \beta)|r_t| \quad (3)$$

wherein $\alpha = 1/(12500|J|)$ and $\beta = 3/|J| - 9/(25|J|)$ are coefficients for adjusting the reward function, |J| is the number of UAVs in the UAV network, and $$l_x^+ = \max\left(\left|x_{t,j} - \frac{x_l + x_u}{2}\right| - \frac{v_1}{2}(x_u - x_l), 0\right)$$

$$l_y^+ = \max\left(\left|y_{t,j} - \frac{y_l + y_u}{2}\right| - \frac{v_1}{2}(y_u - y_l), 0\right)$$

-continued $$l_h^+ = \max\left(\left|h_{t,j} - \frac{h_l + h_u}{2}\right| - \frac{v_1}{2}(h_u - h_l), 0\right),$$

further, $x_{t,j}$ is the longitude of a j-th UAV at moment t, $y_{t,j}$ is the latitude of the j-th UAV at moment t, $h_{t,j}$ is the altitude of the j-th UAV at moment t, $x_l$ is the minimum value of $x_{t,j}$, $x_u$ is the maximum value of $x_{t,j}$, $y_l$ is the minimum value of $y_{t,j}$, $y_u$ is the maximum value of $y_{t,j}$, $h_l$ is the minimum value of $h_{t,j}$, $h_u$ is the maximum value of $h_{t,j}$, and $v_1$ is a constant.

5. The method according to claim 3, further comprising: updating the reward function when any of the UAVs facilitating the UAV network is/are located at or beyond a boundary of a target airspace;

and/or, updating the reward function when connectivity is unattainable between any two UAVs in the UAV network, wherein the reward value determined by the updated reward function is smaller than that of the reward function before the updating; and the updating the reward function when any of the UAVs facilitating the UAV network is/are located at or beyond a boundary of a target airspace comprises:

updating the reward function when a UAV is located at or beyond the boundary of the target airspace using Eq. (4) below:

$$r_t = r_t - (\alpha((l_x^+)^2 + (l_y^+)^2 + (l_h^+)^2) + \beta)|r| \qquad (4)$$

wherein $\alpha = 1/(12500|J|)$ and $\beta = 3/|J| - 9/(25|J|)$ are coefficients for adjusting the reward function, $|J|$ is the number of UAVs in the UAV network, and $$l_x^+ = \max\left(\left|x_{t,j} - \frac{x_l + x_u}{2}\right| - \frac{v_1}{2}(x_u - x_l), 0\right)$$

$$l_y^+ = \max\left(\left|y_{t,j} - \frac{y_l + y_u}{2}\right| - \frac{v_1}{2}(y_u - y_l), 0\right)$$

$$l_h^+ = \max\left(\left|h_{t,j} - \frac{h_l + h_u}{2}\right| - \frac{v_1}{2}(h_u - h_l), 0\right),$$

further, $x_{t,j}$ is the longitude of a j-th UAV at moment t, $y_{t,j}$ is the latitude of the j-th UAV at moment t, $h_{t,j}$ is the altitude of the j-th UAV at moment t, $x_l$ is the minimum value of $x_{t,j}$, $x_u$ is the maximum value of $x_{t,j}$, $y_l$ is the minimum value of $y_{t,j}$, $y_u$ is the maximum value of $y_{t,j}$, $h_l$ is the minimum value of $h_{t,j}$, $h_u$ is the maximum value of $h_{t,j}$, and $v_1$ is a constant.

6. The method according to claim 1, wherein the reward function fulfils a condition represented by Eq. (5) below:

$$\underset{x_{t,j}, y_{t,j}, h_{t,j}, m_{t-1,j}, \{b_{t,i_k}^{(k)}\}}{\text{maximize}} \frac{\sum_{t=1}^{T} \sum_{k=1}^{K} \sum_{i_k=1}^{|U_k|} f_t b_{t,i_k}^{(k)} C_k^{th}}{\sum_{t=1}^{T} \sum_{j \in J} e_{t-1,j}(m_{t-1,j})} \qquad (5)$$

wherein the constraints of the Eq. (5) are as follows: $C_{t,i_kj}^{(k)} \geq C_k^{th} + M_1(b_{t,i_k}^{(k)} - 1)$ is fulfilled, and the UAV network has connectivity, and all UAVs in the UAV network are within a target airspace, and a movement distance $m_{t-1,j}$ of a UAV of the UAV network from a moment t−1 to the moment t is no more than a maximum movement distance between the two moments, wherein:

$$e_{t-1,j}(m_{t-1,j}) = \frac{m_{t-1,j}}{m_{max}}(e_r - 1)e_h + e_h,$$

$m_{max}$ denotes a maximum movement distance between two moments, $e_r$ denotes a ratio of the UAVs' energy consumption of covering the maximum movement distance versus hovering at its current location between two adjacent moments, and $e_h$ is an energy consumption of hovering at the current location;

$b_{t,i_k}^{(k)}$ indicates whether a user $u_{i_k}^{(k)}$ in a set $U_k$ is covered at the moment t, $C_k^{th}$ is a QoS requirement threshold of the users in $U_k$, and $e_{t-1,j}(m_{t-1,j})$ is energy consumption of the UAV j from the moment t−1 to the moment t; and t=1,2, . . . , T , which partitions a full period of time into T time steps, each time step begins from a moment, j is a UAV, J is a set that represents all UAVs with j∈J, the set $U_k$ is a k-th subset of a full set of users in the UAV network, wherein k=1, . . . , K, and all users in the $U_k$ have the same QoS requirement, further, the full set of users comprises all users in the UAV network, and comprises K subsets, and the QoS requirements of any two of the subsets are different.

7. A multi-unmanned aerial vehicle (UAV) continuous movement control device for energy efficient communication coverage, comprising at least a processor and a memory, wherein:

the memory is configured to store computer executable instructions; and the at least a processor executes the computer executable instructions stored in the memory, causing the processor to:

determine observation information at a current moment, the observation information comprising one or more of the following information: energy consumption information of a UAV, coverage indication information of users covered by a UAV network facilitated by the UAV or coverage fairness information of the UAV network;

determine control information corresponding to the observation information using a deep deterministic policy gradient (DDPG) model according to the observation information, wherein the DDPG model is generated from a DDPG algorithm with sample information as an input, the sample information indicating a mapping relationship between sampled observation information and sampled control information; and control the UAV to move according to the control information, wherein a reward function of the DDPG model comprises one or more of the following parameters:

a total quality-of-service (QoS) requirement parameter of users at the current moment, a coverage fairness parameter of the UAV network at the current moment, and an energy consumption parameter of the UAV from a last moment to the current moment; and the reward function fulfils Eq. (1) below:

$$r_t = \frac{f_t A}{\sum_{j \in J} e_{t-1,j}(m_{t-1,j})} \qquad (1)$$

wherein $r_t$ is the reward function of the DDPG model at a moment t, A is a total QoS requirement of users, $f_t$ is a coverage fairness index of the UAV network at the moment t, $$\sum_{j \in J} e_{t-1,j}(m_{t-1,j})$$

is a total energy consumption of all UAVs from a moment t−1 to the moment t, and wherein:
the total QoS requirement of the users is based on receiving data rates of the users.

8. The device according to claim 7, wherein the total QoS requirement of the users A is specifically represented by $$\sum_{k=1}^{K} \sum_{i_k \in U_k} b_{t,i_k}^{(k)} C_k^{th},$$

wherein:
$b_{t,i_k}^{(k)}$ indicates whether a user $u_{i_k}^{(k)}$ in a set $U_k$ is covered at the moment t, $C_k^{th}$ is a QoS requirement threshold of the users in $U_k$, and $e_{t-1,j}(m_{t-1,j})$ is energy consumption of a UAV j from the moment t−1 to the moment t;
further, t is a moment, and t=1, 2, ..., T, which partitions a full period of time into T time steps, each time step begins from a moment, j is a UAV, J is a set that represents all UAVs with j∈J, the set $U_k$ is a k-th subset of a full set of users in the UAV network, wherein k=1, ..., K, and all users in the $U_k$ have the same QoS requirement, further, the full set of users comprises all users in the UAV network, and comprises K subsets, and QoS requirements of any two of the subsets are different.

9. The device according to claim 8, wherein the QoS requirement $C_k^{th}$ of a user in the set $U_k$ satisfies Eq. (2) below:

$$C_{t,i,j}^{(k)} \geq C_k^{th} + M_1(b_{t,i_k}^{(k)} - 1) \quad (2)$$

wherein $C_{t,i,j}^{(k)}$ is a QoS of a user $i_k$ in the set $U_k$ provided by the j-th UAV at a moment t, $M_1$ is a constant that is marginally greater than the maximum $C_k^{th}$, $C_k^{th}$ is a QoS requirement threshold of users in the set $U_k$, $b_{t,i_k}^{(k)} = \max_{j \in J}\{b_{t,i,j}^{(k)}\}$ represents whether a user $u_{i_k}^{(k)}$ in the set $U_k$ is covered at the moment t.

10. The device according to claim 8, wherein the processor is further caused to:
update the reward function when any of the UAVs facilitating the UAV network is/are located at or beyond a boundary of a target airspace;
and/or,
update the reward function when connectivity is unattainable between any two UAVs in the UAV network,
wherein the reward value determined by the updated reward function is smaller than that of the reward function before the updating; and
the processor is further caused to:
update the reward function when a UAV is located at or beyond the boundary of the target airspace using Eq. (3) below:

$$r_t = r_t - (\alpha((l_x^+)^2 + (l_y^+)^2 + (l_h^+)^2) + \beta)|r_t| \quad (3)$$

wherein $\alpha = 1/(12500|J|)$ and $\beta = 3/|J| - 9/(25|J|)$ are coefficients for adjusting the reward function, $|J|$ is the number of UAVs in the UAV network, and $$l_x^+ = \max\left(\left|x_{t,j} - \frac{x_l + x_u}{2}\right| - \frac{v_1}{2}(x_u - x_l), 0\right)$$

$$l_y^+ = \max\left(\left|y_{t,j} - \frac{y_l + y_u}{2}\right| - \frac{v_1}{2}(y_u - y_l), 0\right)$$

$$l_h^+ = \max\left(\left|h_{t,j} - \frac{h_l + h_u}{2}\right| - \frac{v_1}{2}(h_u - h_l), 0\right),$$

further, $x_{t,j}$ is the longitude of a j-th UAV at moment t, $y_{t,j}$ is the latitude of the j-th UAV at moment t, $h_{t,j}$ is the altitude of the j-th UAV at moment t, $x_l$ is the minimum value of $x_{t,j}$, $x_u$ is the maximum value of $x_{t,j}$, $y_l$ is the minimum value of $y_{t,j}$, $y_u$ is the maximum value of $y_{t,j}$, $h_l$ is the minimum value of $h_{t,j}$, $h_u$ is the maximum value of $h_{t,j}$, and $v_1$ is a constant.

11. The device according to claim 9, wherein the processor is further caused to:
update the reward function when any of the UAVs facilitating the UAV network is/are located at or beyond a boundary of a target airspace;
and/or,
update the reward function when connectivity is unattainable between any two UAVs in the UAV network,
wherein the reward value determined by the updated reward function is smaller than that of the reward function before the updating; and
the processor is further caused to:
update the reward function when a UAV is located at or beyond the boundary of the target airspace using Eq. (4) below:

$$r_t = r_t - (\alpha((l_x^+)^2 + (l_y^+)^2 + (l_h^+)^2) + \beta)|r_t| \quad (4)$$

wherein $\alpha = 1/(12500|J|)$ and $\beta = 3/|J| - 9/(25|J|)$ are coefficients for adjusting the reward function, $|J|$ is the number of UAVs in the UAV network, and $$l_x^+ = \max\left(\left|x_{t,j} - \frac{x_l + x_u}{2}\right| - \frac{v_1}{2}(x_u - x_l), 0\right)$$

$$l_y^+ = \max\left(\left|y_{t,j} - \frac{y_l + y_u}{2}\right| - \frac{v_1}{2}(y_u - y_l), 0\right)$$

$$l_h^+ = \max\left(\left|h_{t,j} - \frac{h_l + h_u}{2}\right| - \frac{v_1}{2}(h_u - h_l), 0\right),$$

further, $x_{t,j}$ is the longitude of a j-th UAV at moment t, $y_{t,j}$ is the latitude of the j-th UAV at moment t, $h_{t,j}$ is the altitude of the j-th UAV at moment t, $x_l$ is the minimum value of $x_{t,j}$, $x_u$ is the maximum value of $x_{t,j}$, $y_l$ is the minimum value of $y_{t,j}$, $y_u$ is the maximum value of $y_{t,j}$, $h_l$ is the minimum value of $h_{t,j}$, $h_u$ is the maximum value of $h_{t,j}$, and $v_1$ is a constant.

12. The device according to claim 7, wherein the reward function fulfils a condition represented by Eq. (5) below:

$$\underset{x_{t,j}, y_{t,j}, h_{t,j}, m_{t-1,j}, \{b_{t,i_k}^{(k)}\}}{\text{maximize}} \frac{\sum_{t=1}^{T} \sum_{k=1}^{K} \sum_{i_k=1}^{|U_k|} f_t b_{t,i_k}^{(k)} C_k^{th}}{\sum_{t=1}^{T} \sum_{j \in J} e_{t-1,j}(m_{t-1,j})} \quad (5)$$

wherein the constraints of the Eq. (5) are as follows: $C_{t,i,j}^{(k)} \geq C_k^{th} + M_1(b_{t,i_k}^{(k)} - 1)$ is fulfilled, and the UAV network has connectivity, and all UAVs in the UAV network are within a target airspace, and a movement distance $m_{t-1,j}$ of a UAV of the UAV network from a moment t−1 to the moment t is no more than a maximum movement distance between the two moments,
wherein:

$$e_{t-1,j}(m_{t-1,j}) = \frac{m_{t-1,j}}{m_{max}}(e_r - 1)e_h + e_h,$$

$m_{max}$ denotes a maximum movement distance between two moments, $e_r$ denotes a ratio of the UAVs' energy consumption of covering the maximum movement distance versus hovering at its current location between two adjacent moments, and $e_h$ is an energy consumption of hovering at the current location;

$b_{t,i_k}^{(k)}$ indicates whether a user $u_{i_k}^{(k)}$ in a set $U_k$ is covered at the moment t, $C_k^{th}$ is a QoS requirement threshold of the users in $U_k$, and $e_{t-1,j}(m_{t-1,j})$ is energy consumption of the UAV j from the moment t−1 to the moment t; and t=1, 2, . . . , T, which partitions a full period of time into T time steps, each time step begins from a moment, j is a UAV, J is a set that represents all UAVs with j∈J, the set $U_k$ is a k-th subset of a full set of users in the UAV network, wherein k=1, . . . , K, and all users in the $U_k$ have the same QoS requirement, further, the full set of users comprises all users in the UAV network, and comprises K subsets, and the QoS requirements of any two of the subsets are different.

13. A non-transitory computer readable storage medium, storing computer executable instructions which, when executed by a processor, implement the multi-UAV continuous movement control method for energy efficient communication coverage according to claim 1.

* * * * *